US 6,246,996 B1

(12) United States Patent
Stein et al.

(10) Patent No.: US 6,246,996 B1
(45) Date of Patent: *Jun. 12, 2001

(54) COMPUTERIZED SYSTEM FOR FACILITATING TRANSACTIONS BETWEEN PARTIES ON THE INTERNET USING E-MAIL

(75) Inventors: Lee H. Stein, Rancho Santa Fe; Einar A. Stefferud, Huntington Beach, both of CA (US); Nathaniel S. Borenstein, Morristown, NJ (US); Marshall T. Rose, Mountain View, CA (US)

(73) Assignee: Messagemedia, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/074,354

(22) Filed: May 7, 1998

Related U.S. Application Data

(63) Continuation of application No. 08/308,101, filed on Sep. 16, 1994.

(51) Int. Cl.[7] ............................................. G06F 17/60
(52) U.S. Cl. ............................................. 705/26; 705/39
(58) Field of Search ............................................. 705/26, 27, 34, 705/38, 39, 40, 42, 44; 709/200, 201, 202, 203, 217, 218, 219

(56) References Cited

U.S. PATENT DOCUMENTS 4,106,060   8/1978   Chapman, Jr. .
4,255,796   3/1981   Gabbe et al. .

(List continued on next page.)

FOREIGN PATENT DOCUMENTS

10320646 * 12/1998 (JP) ................................. G06F/17/60

OTHER PUBLICATIONS

Resnick, Rosalind, "Cyber sales", World Trade, vol. 7, No. 7, pp. 28–32, Aug. 1994.*
Anonymous, Dialog File 9 (Business and Industry database), No. 1029589, "Virtual Mall Opens in Cyberspace (SoftLock Services, Anywhere Assoc. have launched "Downtown Anywhere", an Internet svc on the World Wide Web called the first virtual shopping mall)" Jun. 1994.*
Anonymous, Dialog file 16 (Gale Group PROMT(R) database), "Service to Jump–Start Commerce on Internet", Communications Week, 3 pages, Apr. 1994.*

(List continued on next page.)

*Primary Examiner*—Eric W. Stamber
*Assistant Examiner*—Alexander Kalinowski
(74) *Attorney, Agent, or Firm*—Brinks Hofer Gilson & Lione

(57) ABSTRACT

A payment system for enabling a first Internet user to make a payment to a second Internet user, typically for the purchase of an information product deliverable over the Internet. The payment system provides cardholder accounts for the first and second Internet users. When the second user sends the information product to the first user over the Internet, the second user also makes a request over the Internet to a front end portion of the payment system requesting payment from the first user. The front end portion of the payment system queries the first user over the Internet whether to proceed with payment to the second user. If the first user replies affirmatively, a charge to the first user is processed off the Internet; however if the first user replies negatively, the first user is not charged for the information product. The payment system informs the second user regarding whether the first user's decision and pays the second user upon collection of the charge from the first user. Security is maintained by isolating financial and credit information of users' cardholder accounts from the front end portion of the payment system and by isolating the account identifying information from the associated e-mail address.

18 Claims, 9 Drawing Sheets

U.S. PATENT DOCUMENTS

| | | |
|---|---|---|
| 4,326,098 | 4/1982 | Bouricius et al. . |
| 4,386,266 | 5/1983 | Chesarek . |
| 4,528,643 | 7/1985 | Freeny, Jr. . |
| 4,532,554 | 7/1985 | Skala . |
| 4,645,873 | 2/1987 | Chomet . |
| 4,674,066 | 6/1987 | Kucera . |
| 4,744,050 | 5/1988 | Hirosawa et al. . |
| 4,759,063 | 7/1988 | Chaum . |
| 4,759,064 | 7/1988 | Chaum . |
| 4,799,156 | 1/1989 | Shavit et al. . |
| 4,914,698 | 4/1990 | Chaum . |
| 4,926,480 | 5/1990 | Chaum . |
| 4,932,042 | 6/1990 | Baral et al. . |
| 4,941,170 | 7/1990 | Herbst . |
| 4,947,028 | 8/1990 | Gorog . |
| 4,947,430 | 8/1990 | Chaum . |
| 4,949,380 | 8/1990 | Chaum . |
| 4,960,981 | 10/1990 | Benton et al. . |
| 4,970,681 | 11/1990 | Bennett . |
| 4,984,178 | 1/1991 | Hemphill et al. . |
| 4,989,238 | 1/1991 | Iggulden et al. . |
| 4,996,711 | 2/1991 | Chaum . |
| 5,043,891 | 8/1991 | Goldstein et al. . |
| 5,077,668 | 12/1991 | Doi . |
| 5,084,819 | 1/1992 | Dewey et al. . |
| 5,093,918 | 3/1992 | Heyen et al. . |
| 5,115,326 | 5/1992 | Burgess et al. . |
| 5,122,950 | 6/1992 | Benton et al. . |
| 5,146,488 | 9/1992 | Okada et al. . |
| 5,181,238 | 1/1993 | Medamana et al. . |
| 5,193,110 | 3/1993 | Jones et al. . |
| 5,204,961 | 4/1993 | Barlow . |
| 5,220,501 | 6/1993 | Lawlor et al. . |
| 5,222,234 | 6/1993 | Wang et al. . |
| 5,227,778 | 7/1993 | Vacon et al. . |
| 5,227,893 | 7/1993 | Ett . |
| 5,230,048 | 7/1993 | Moy . |
| 5,241,466 | 8/1993 | Perry et al. . |
| 5,247,591 | 9/1993 | Baran . |
| 5,255,305 | 10/1993 | Sattar . |
| 5,263,167 | 11/1993 | Conner, Jr. et al. . |
| 5,265,033 | 11/1993 | Vajik et al. . |
| 5,276,628 | 1/1994 | Schneiderhan . |
| 5,283,829 | 2/1994 | Anderson . |
| 5,291,554 | 3/1994 | Morales . |
| 5,295,068 | 3/1994 | Nishino et al. . |
| 5,295,181 | 3/1994 | Kuo . |
| 5,297,027 | 3/1994 | Morimoto et al. . |
| 5,299,123 | 3/1994 | Wang et al. . |
| 5,299,255 | 3/1994 | Iwaki et al. . |
| 5,303,361 | 4/1994 | Colwell et al. . |
| 5,311,438 | 5/1994 | Sellers et al. . |
| 5,319,710 | 6/1994 | Atalla et al. . |
| 5,329,589 | 7/1994 | Fraser et al. . |
| 5,339,156 | 8/1994 | Ishii . |
| 5,384,703 | 1/1995 | Withgott et al. . |
| 5,414,773 | 5/1995 | Handelman . |
| 5,418,951 | 5/1995 | Damashek . |
| 5,420,926 | 5/1995 | Low et al. . |
| 5,426,594 | 6/1995 | Wright et al. . |
| 5,428,606 | 6/1995 | Moskowitz . |
| 5,432,841 | 7/1995 | Rimer . |
| 5,436,961 | 7/1995 | Kobayashi . |
| 5,446,759 | 8/1995 | Campana, Jr. . |
| 5,450,425 | 9/1995 | Gunn et al. . |
| 5,457,797 | 10/1995 | Butterworth et al. . |
| 5,465,206 * | 11/1995 | Hilt et al. ............................ 705/40 |
| 5,467,390 | 11/1995 | Brankley et al. . |
| 5,493,692 | 2/1996 | Theimer et al. . |
| 5,508,817 | 4/1996 | Kunigami . |
| 5,530,739 | 6/1996 | Okado et al. . |
| 5,537,586 | 7/1996 | Amram et al. . |
| 5,557,518 | 9/1996 | Rosen . |
| 5,559,721 | 9/1996 | Ishii . |
| 5,590,197 | 12/1996 | Chen et al. . |
| 5,649,186 | 7/1997 | Ferguson . |
| 5,724,424 * | 3/1998 | Gifford .................................. 380/24 |
| 5,757,917 | 5/1998 | Rose et al. . |
| 5,920,847 * | 7/1999 | Kolling et al. ......................... 705/40 |
| 6,032,133 * | 2/2000 | Hilt et al. .............................. 705/40 |

OTHER PUBLICATIONS

Newsbytes News Network, Feb. 15, 1995, Wendy Bounds, Jared Sandberg, "Carnegie Mellon, Visa Plan to offer payment system for data from Internet" all.

PC Week, Mar. 20, 1995, v12 n 11 pI(2), Anne Knowles, "Improved Internet security enabling on–line commerce", all.

NewsHound User Guide Internet E–Mail, Date Unknown.

ED Krol. "The Whole Internet User's Guide & Catalog," 1994, pp. 101–148.

Brian Thomas, "Internet for Scientists & Engineers" 1995, pp. 57–70.

Reid Wright, The Ottawa Citizen, Sep. 15, 1994; pp. 3–4.

Rick Grehan, Byte, Levels of Secrecy, Jun., 1994; pp. 6–7.

Peter Wayner, Byte, Agents Away, May, 1994; pp. 8–14.

Michael Dresser; The Baltimore Sun, Computer Shopping Network started; Apr. 14, 1994; pp. 3–4.

John Honderich; The Toronto Star, Starfax will track personal portfolios; Jan. 22, 1994; pp. 2–3.

Toronto Star; Personalized Portfolio Performance Reports; Jan. 21, 1994; p. 4.

Oscar Rojo; Toronto Star, Program develops good habits in 3 to 5 year–old children; Aug. 23, 1993; p. 5–6.

PR Newswire Association; Personal Info Clips—The New You Want, When You Want It; Jun. 8, 1993; p. 7–8.

Los Angeles Times, Wire Reports; Jul. 21, 1992; p. 9.

Tom McCusker; Datamation, General Electric Co, The Datamation 100; Jun. 15, 1992; pp. 10–11.

E.R. Sander; Investor's Business Daily, Newspapers Tiptoe Into Electronic Age Via Fax Services; Mar. 25, 1992; pp. 12–14.

James D. McQuaid; DM News, Putting the Relations in Relationship Marketing; Dec. 2, 1991; pp. 15–18.

Business Wire Inc.; Wiltek supplies fax and electronic mail options for Dow Jones News Clipping Service; Nov. 11, 1991; pp. 19–20.

Database, Electronic Clipping Services launched by Telebase; SDI—The Database News Section; Aug., 1991; p. 21.

Toronto Star; StarPhone gets update with digital satellite; Mar. 6, 1994; p. 3.

Nancy Nachman–Hunt; Boulder County Business Report, 'Reportfolio' provides investor with stock holdings report card; Feb. 1995; pp. 7–10.

John Eckhouse; San Francisco Chronicle, Publishers Discover the Power of the Fax Office Machines offer faster, cheaper route for newlet; Nov. 25, 1994; pp. 11–13.

Carol Smith; Los Angeles Times, On the Move/Carol Smith: Keeping Up On Things Wherever You Are; Mar. 9, 1994; pp. 14–16.

The Houston Chronicle; Chronicle begins offering financial datafax service; Feb. 1, 1994; pp. 17–18.

John Eckhouse; San Francisco Chronicle, Letting Computers Choose Your News; Dec. 27, 1993; pp. 19–20.

Barbara Quint; Searcher, Newspapers reborn in electronic information age; Jun., 1993; pp. 21–24.

Ira Teinowitz; Advertising Age, Just the fax, ma'am latest newspaper refrain; Apr. 26, 1993; pp. 25–27.

George Garneau; Editor & Publishing Magazine, Financial Fax has been catching on since its launch last summer; Mar. 27, 1993; pp. 28–29.

The Arizona Republic; Personalized Stock Quotes Now Offered by Republic; Mar. 21, 1993; pp. 30–31.

M. L. Stein; Editor & Publishing Magazine, Financial Service; Aug. 15, 1992; p. 32.

Business Wire, Los Angeles Times Syndicate to launch Financial Fax; Jul. 20, 1992; pp. 33–34.

Wayne Walley; Advertising Age; Wayne Walley Publishes Media Works; Jan. 14, 1991; pp. 36–37.

Eleanor Randolph; The Washington Post; Extra! Extra! Who Cares?; Apr. 1, 1990; pp. 39–43.

Tom Smith; Network World, Faxing lets daily papers provide up–to–the–minute 'zoned' news; Feb. 26, 1990; pp. 44–45.

Colin M. McQuillan; Database, A Guide to Mutual Fund Databases; Aug., 1994; pp. 2–8.

Lee Goldberg; Electronic Design, Prototype e–mail system includes multimedia, intelligent retrieval; Apr. 4, 1994; pp. 9–10.

Christina M. Darnowski; Database, SEC On–Line—A database review; Dec., 1991; pp. 11–19.

Greg R. Notess; Database, SEC Edgar And the Internet Town Hall; Securities and Exchange Commission; On the Nets; Aug., 1994; pp. 21–26.

Cote, Raymond; Byte, A Firstclass Experience; Sep., 1993; pp. 28–32.

Jon Udell; Byte, Simple Mapi Delivers; Apr., 1993; pp. 34–37.

Robert L. Scheier; PC Week, PDAs spell sea change for the PC Industry; Nov. 16, 1992; pp. 15–18.

PR Newswire Association; Individual, Inc. Files For U.S. Patent; Jul. 9, 1992; p. 19.

Database; Individual Inc. Moves Into International Market . . . ; Aug., 1991; pp. 9–10.

Robin Meyerowitz; MacWeek; Foresight set to introduce FastPace Instant Contact; Jul. 25, 1994; pp. 2–3.

John Rizzo; MacUser; And E–mail for all; E–mail software and gateway software packages of creating a cross–platform E–mail system; Jul., 1994; pp. 4–6.

Jim Nash; Computerworld, Beyond Mail software steps Beyond competition; Aug. 19, 1991; pp. 7–8.

Paula J. Hane; Information Today, NewsEdge Forges Alliances with Content; Oct. 1, 1998; pp. 12–14.

Business Wire, Inc.; Individual Selected for Electronic News Delivery to AT&T Global Sales Team; Sep. 9, 1997; pp. 16–17.

Media Daily; Individual Sees Strong Sales, Subscriber Growth; Feb. 24, 1995; pp. 21–22.

Molly W. Joss; The Seybold Report on Publishing Systems; Market Research In Publishing: Where to Find the Key Data; Includes Related Articles on Census Statistics and Trade Assns; Dec. 31, 1994; pp. 23–37.

Electronic Information Report; Individual Inc. Sees Strong Sales, Subscriber Growth; Feb. 24, 1994; pp. 38.

Business Wire, Inc.; Financial Times and The Wall Street Journal; Mar. 13, 1995; pp. 59–60.

Searcher; The "consumer–ization" of Business data; Mar., 1995; pp. 61–63.

PR Newswire Association, Inc.; Major Information Providers Sign Up for EWorld; Jan. 5, 1994; pp. 64–68.

Business Wire, Inc.; Dow Jones launches Dow Jones News; Apr. 27, 1993; pp. 69–70.

PR Newswire Association; AT&T Easylink Services' Customers to Have Access to International Newswires through Comtex; Mar. 2, 1992; pp. 74–75.

PR Newswire Association; Comtex to Deliver American Banker via Electronic Mail; Oct. 24, 1991; pp. 78–79.

PR Newswire Association; Comtex and Soft–Switch Join Forces to Deliver News Via Electronic Mail; Feb. 6, 1991; pp. 80–81.

LAN Magazine, Notes Users Get Custom CIS, Mar. 1994, p. 18.

Business Wire; Drakkar Software ShipsFirst; Jan. 3, 1994.

Business Wire; Gallup and MCI Developing Innovative Survey; Sep. 21, 1993.

Bank Systems & Technology, v32 n1, Jan. 6, 1995, Jacqueline Day, "Industry Players in hot pursuit of secure Internet transaction mode", all.

Advertising Age, Dec. 19, 1994, Curtis Lang, "Cashing in: The rush is on to buy and sell on the Internet", pp. 11–12.

PC Week, Mar. 20, 1995, v12 n11 p1(2), Anne Knowles, "Improved Internet security enabling on–line commerce", all.

The Wall Street Journal, pB7 (W) pB9 (E) col 1, Nov. 9, 1994, Don Clark, "Microsoft, Visa to ointly develop PC electronic–shopping software", abstract only.

Information Today, v12 n3 p 43, Mar. 1995, "The Check is in the e–mail", all.

Network World, v11 n50 p1, Dec. 12, 1994, Adam Gaffin, "Avrsion therapy: Banks overcoming fear of the 'net", all.

Communications of the ACM, v37 n11 p 12–21, Nov. 1994, Larry Press, "Commercialization of the Internet", all.

* cited by examiner

Fig. 6A — 128: 102B ... (129)

Fig. 6B — 216: INQUIRY-REQUEST: 102B ...

Fig. 6C — 218: INQUIRY-RESULT: 102B, 106B ...

Fig. 6D — TRANSFER-REQUEST: 102B, 102S, 130, 132, 134, 112S, 136 ...

Fig. 6E — 140: TRANSFER-QUERY: 142, 103B, 103S, 130, 132, 135, 112B ...

Fig. 6F — 150: TRANSFER-RESPONSE: 142, 152 ...

Fig. 6I COLLECTION-FAILURE NOTIFICATION: 138, 134, 112, ... — 211

Fig. 6L PAYIN-CHARGEBACK NOTIFICATION: 144, 134, ... — 220

Fig. 6H PAYIN-FAILURE NOTIFICATION: 144, 108B, 134, 112, ... — 210

Fig. 6K PAYOUT-NOTIFICATION: 102, 150, 152, 146, 149, ... — 214

Fig. 6G TRANSFER-RESULT: 142, 103S, 103B, 130, 132, 135, 152, 136, 112S, 134, ... — 160

Fig. 6J PAYIN-NOTIFICATION MESSAGE: 102B, 134, 112, 144, 146, 148, ... — 212

Fig. 6O

CAPABILITIES – RESULT 156
158
159
...

CAPABILITIES – REQUEST

NEWACCT – RESULT 106
102
...

PAYOUT – CHARGEBACK NOTIFICATION 138
134
112
...

APPLICATION – RESULT 104
112
...

228

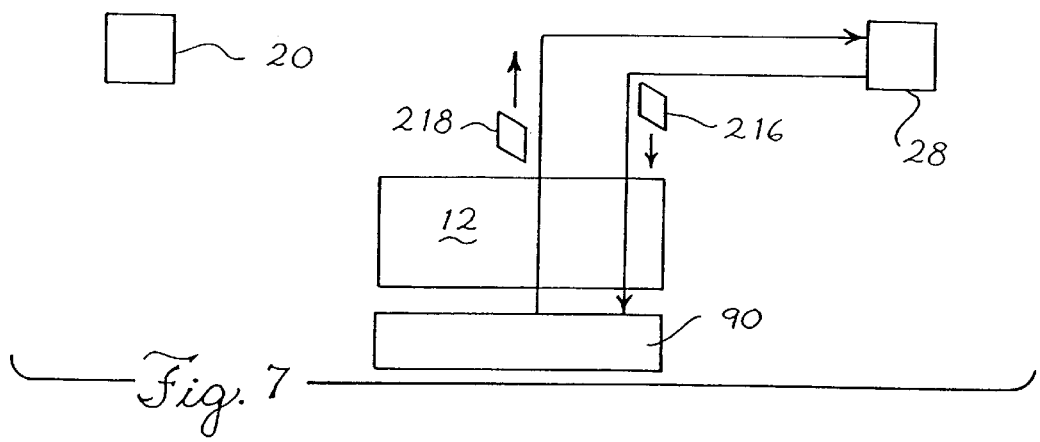
Fig. 7
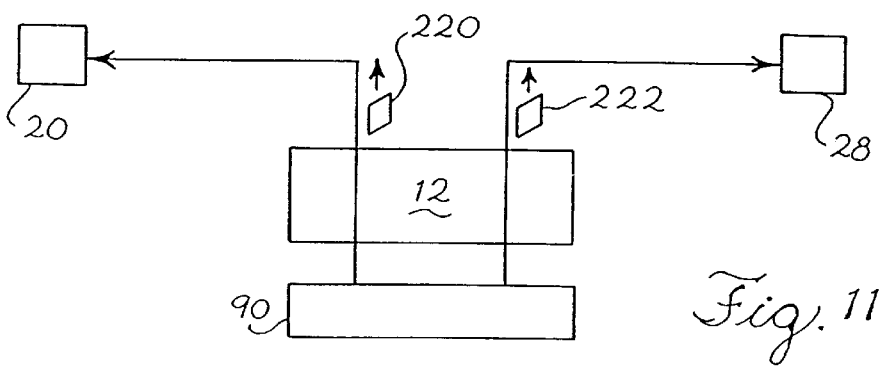
Fig. 11
Fig. 12
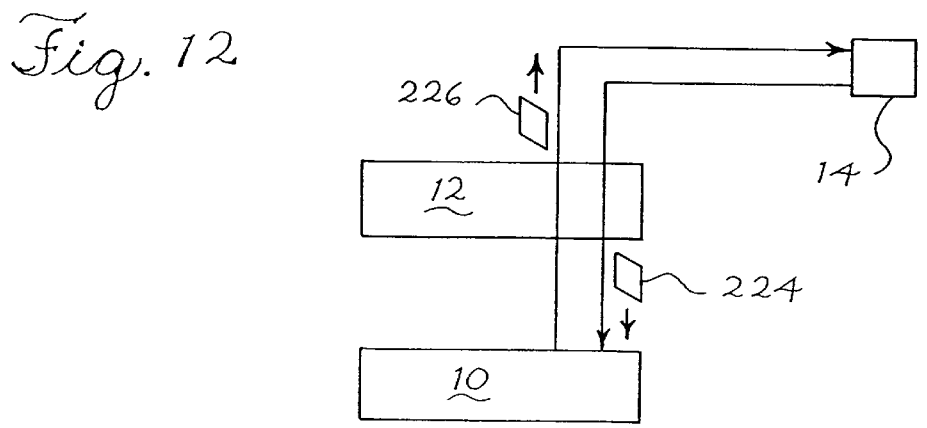

COMPUTERIZED SYSTEM FOR FACILITATING TRANSACTIONS BETWEEN PARTIES ON THE INTERNET USING E-MAIL

REFERENCE TO RELATED APPLICATION

The present application is a continuation of Ser. No. 08/308,101, filed Sep. 16, 1994, the entire disclosure of which is incorporated by reference herein.

REFERENCE TO MICROFICHE APPENDIX

Included with this specification is seven sheets of microfiche including 666 total frames.

BACKGROUND OF THE INVENTION

The present invention relates to a system for enabling payment for information products that can be transferred electronically over a nonsecure network, and more particularly, the present invention relates to a payment system that can be used to enable an Internet user to make a payment to another Internet user for information products of value that can be electronically transferred over the Internet.

The Internet has emerged as a large community of electronically-connected users located around the world who readily and regularly exchange significant amounts of information. The Internet continues to serve its original purposes of providing for access and exchange of information among government agencies, laboratories, and universities for research and education. In addition, the Internet has evolved to serve a variety of interests and forums that extend beyond its original goals.

The Internet has been considered as a potential new marketplace for information products. It is now physically possible to transfer information products such as articles, software, cartoons, etc., via the Internet.

Using the Internet as a marketplace has several advantages. Information products can be delivered electronically without physical packaging. Because information is easily duplicated with the point and click of a mouse on a user's workstation, the cost of manufacturing and reproducing inventory closely approaches zero, leaving the cost of creating or synthesizing the information as the dominant cost. Once an information product has been developed, there may be little or no cost of manufacturing or inventory since a copy of the product can be shipped whenever a buyer makes a purchase given that the merchant has the bandwidth available. Given that the cost of inventory on the Internet is close to zero, there are potentially tens of thousands of information sellers, i.e. people with ideas or information products to sell, on the Internet. Another advantage of using the Internet as a marketplace is that, depending on the kind of information product involved, processing of a buyer's order can be automated, so there is no need for a worker to manually intervene to complete a transaction.

Although the Internet presently has the capability to serve as a marketplace for new information products, use of the Internet for this purpose has been slow to develop. One reason that accounts for this lack of development is that it is difficult to pay for information products using the Internet. A user cannot send cash or a check via the Internet and sending a check via physical delivery services is slow. Sending a credit card number over the Internet poses security problems. Moreover, even if it were reasonably safe to send credit card numbers, there are a lot of potential sellers of information products who do not have—and could not qualify for—the required merchant accounts. Credit card companies require a seller who accepts credit card for payment, to have a merchant account. Conventional merchant accounts require a relatively high standard of credit worthiness and a financial guarantee. The need for a conventional merchant account impedes commerce in the Internet marketplace because an average Internet user may have a difficult time qualifying for a merchant account.

Accordingly, there is a need for a system that solves the payment problem on the Internet to enable development of a commercial market.

SUMMARY OF THE INVENTION

According to a first embodiment of the present invention, there is provided a method and payment system for enabling a first Internet user to make a payment to a second Internet user, typically for the purchase of an information product deliverable over the Internet. The payment system provides cardholder accounts for the first and second Internet users. When the second user sends the information product to the first user over the Internet, the second user also makes a request over the Internet to a front end portion of the payment system requesting payment from the first user. The front end portion of the payment system queries the first user over the Internet whether to proceed with payment to the second user. If the first user replies affirmatively, a charge to the first user is processed off the Internet; however if the first user replies negatively, the first user is not charged for the information product. The payment system informs the second user regarding whether the first user's decision and pays the second user upon collection of the charge from the first user. Security is maintained by isolating financial and credit information of users' cardholder accounts from the front end portion of the payment system and by isolating the account identifying information from the associated e-mail address.

BRIEF DESCRIPTION OF THE DRAWINGS

These and other features, aspects, and advantages of the present invention will become better understood with regard to the following description, appended claims, and accompanying drawings where:

FIGS. 6A–6Q are diagrams of data messages used in connection with the payment system of FIG. 1;

FIG. 7 is a flow chart showing the message flow for a cardholder inquiry request using the payment system of FIG. 1;

FIG. 11 is a flow chart showing message flow for a chargeback process using the payment system of FIG. 1;

FIG. 12 is a flow chart showing message flow for a capabilities request process using the payment system of FIG. 1.

DETAILED DESCRIPTION OF THE PREFERRED EMBODIMENTS

I. Overall System

Figure 1:
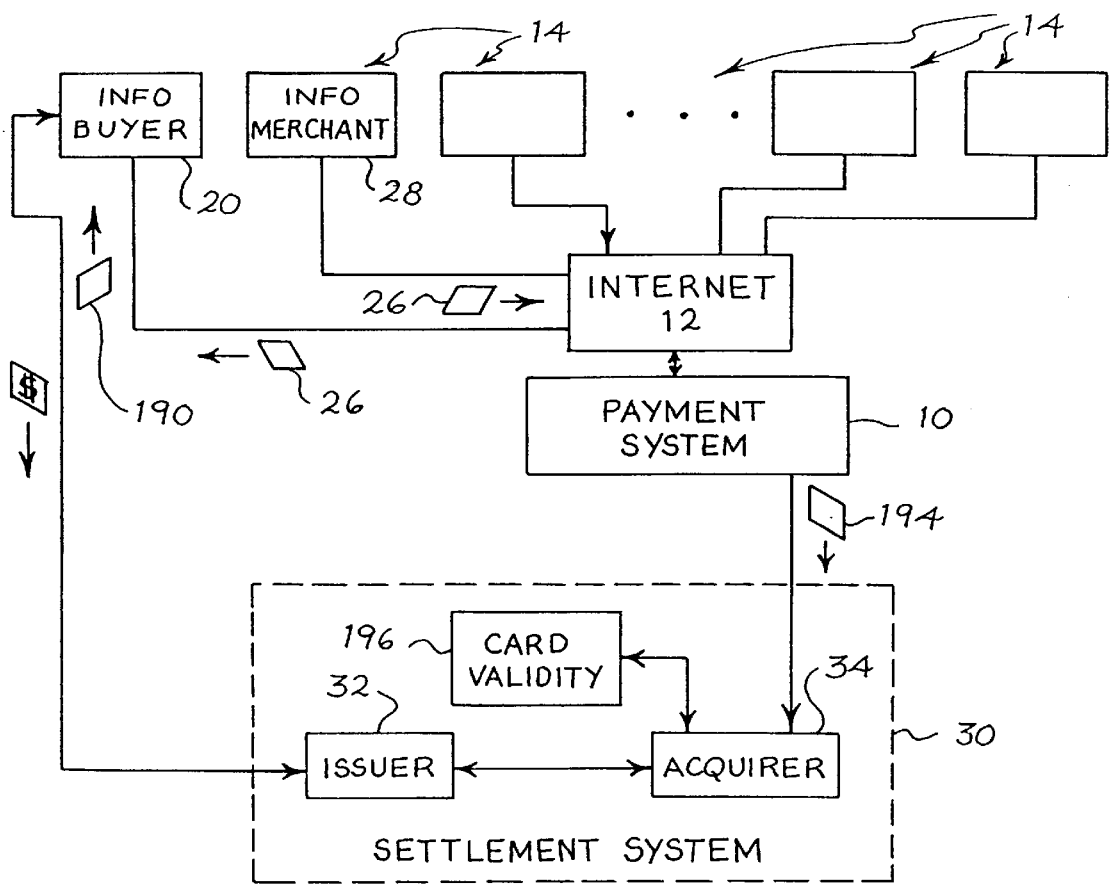
FIG. 1 is a block diagram illustrating the relationship between a payment system of a first embodiment of the present invention to a large network.

FIG. 1 shows a block diagram of a first embodiment of the present invention for a payment system 10. The payment system 10 is shown in relation to the Internet network 12. The Internet network 12 is a large, quasi-public network having many users 14. The Internet network 12 is of a type that the users 14 can access by various means such as conventional commercial telephone systems. The network 12 provides numerous services for its users such as e-mail or World Wide Web (WWW). Although the payment system 10 is specifically useful for the Internet, it may be used in conjunction with other e-mail based systems having a plurality of users.

In the embodiment of FIG. 1, one of the users 14 (designated as an information buyer 20) wishes to acquire an information product 26 from another of the users (designated as an information seller 28). The information seller 28 may be any user with an information product to vend. The information product 26 can be any item that is transferable over the Internet network 12. The information product 26 may be a message, an article, an original work of authorship, a composition, a writing, music, a pictorial work, a drawing, a cartoon, a story, a software program, a recipe, jokes, and so on. The information seller 28 wishes to sell a copy of the information product 26 to the information buyer 20 at a price. The price may be an advertised price (e.g. advertised over the Internet, on a bulletin board, or other media), or may be a negotiated price (e.g. negotiated via e-mail exchange). Although the example of FIG. 1 shows only one information seller 28 and one information buyer 20, the payment system 10 is understood to extend to include multiple buyers of one seller, multiple sellers to one buyer, and multiple sellers and multiple buyers. Also, a buyer or a seller may be an individual, a company, or an institution.

Also shown in FIG. 1 is a financial transaction settlement system 30. The financial transaction settlement system 30 represents presently-available commercial institutions that process credit and other financial transactions. For example, the financial transaction settlement system 30 may represent commercially available credit card processing institutions (e.g. Visa, Master Card, Discover, and so on). The financial transaction settlement system 30 includes two components: an issuer 32 and an acquirer 34. The issuer 32 includes banks, or other institutions, that issue credit cards to persons, sends statements and bills to credit card holders on a regular basis, and collects payment from the credit card holders. These functions are not performed on the Internet but use conventional mail delivery, authorized direct withdrawals from bank accounts, etc. The payment system 10 of the present embodiment utilizes these commercially available issuers 32 to bill users and to collect payment from users for their transactions on the Internet 12 using the payment system 10. For example, a user's transactions using the Internet would show up on the user's credit card statement as a charge from the payment system 10 although individual transactions using the payment system 10 on the Internet 12 may not be specifically listed on the credit card statement. The financial transaction settlement system 30 also includes the acquirer component 34. This acquirer component 34 is a bank or other institution that provides a merchant account to the payment system 10. The merchant account provided to the payment system 10 is similar or identical to the conventional merchant accounts that are provided to other businesses. By means of having the merchant account, the payment system 10 forwards user charges to the acquirer component 34 thereby getting user charges into a conventional, commercially-available settlement system. As mentioned above, the acquirer 34 processes the user charges received from the payment system and passes this information to the issuer component 32 for the preparation and sending of monthly statements and bills to users and collecting payment from users.

Figure 2:
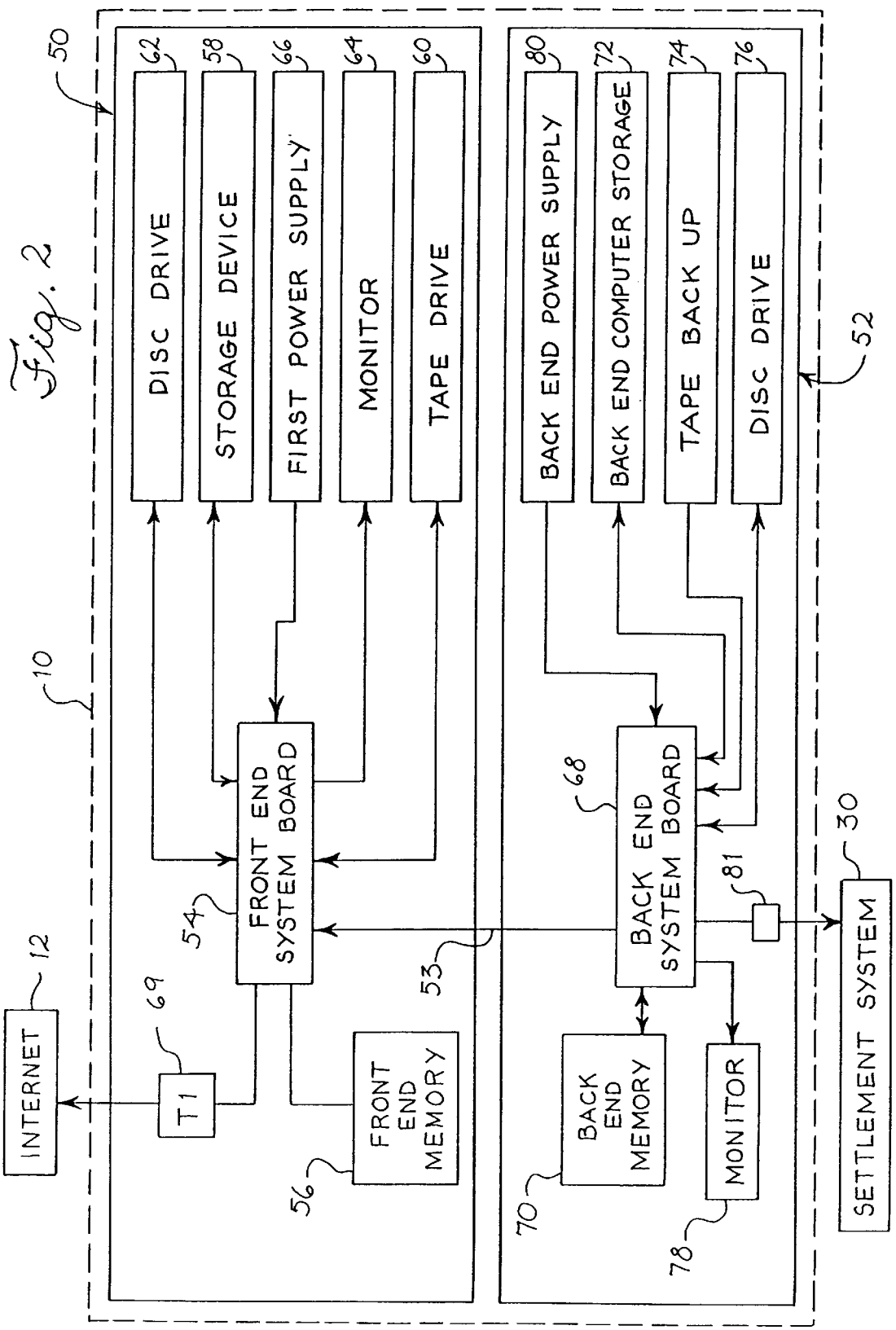
FIG. 2 is a block diagram of a hardware configuration for the payment system of FIG. 1.

FIG. 2 is a block diagram illustrating one possible configuration of hardware components used to implement the payment system 10 of FIG. 1. The payment system 10 includes two computers: a front end computer 50 and a back end computer 52. The front end computer 50 and the back end computer 52 are connected together via a private network 53. In a preferred embodiment, the private network is an Ethernet network. The front end computer 50 includes a front end system board 54 associated with a front end memory 56, a storage device 58 such as a fixed disk drive, a back up tape drive 60, a removable media drive 62, a monitor 64, and a power supply 66. The front end computer 50 is connected to the Internet 12 is by means of a leased T1 line 69.

The back end computer 52 includes a back end computer system board 68 associated with a back end computer memory 70, a back end computer storage device 72 such as a fixed disk drive, a back up tape drive 74, a removable media drive 76, a monitor 78, and a power supply 80. The back end computer 52 is connected to the front end computer 50 by means of Ethernet cable. The back end computer 52 also has a Novell LAN 81 that provides a communication link to the settlement system 30.

Both the front end computer 50 and the back end computer 52 in this embodiment are preferably commercially available Sun Microsystems SS1000 computers. Preferably, both the front end computer 50 and the back end computer 52 are equipped with 64 MB memory. The dedicated private network is an Ethernet and includes a SBus host adaptor. The communication server is a Sun Microsystems SPARCserver 1000. Both the front end monitor 64 and the back end monitor 78 are commercially available Sun 17" monitors. The front end and back end tape drives are Python SGB tape drives using 4 mm tape available from Sony, Inc. The front end disk drive 58 and the back end disk drive 72 are commercially available Seagate 1.7 GB disk drives. The host adaptor is a Sun Microsystems SBus host adaptor. The network server is a commercially available Sun Microsystems SSarray 101.

Figure 3:
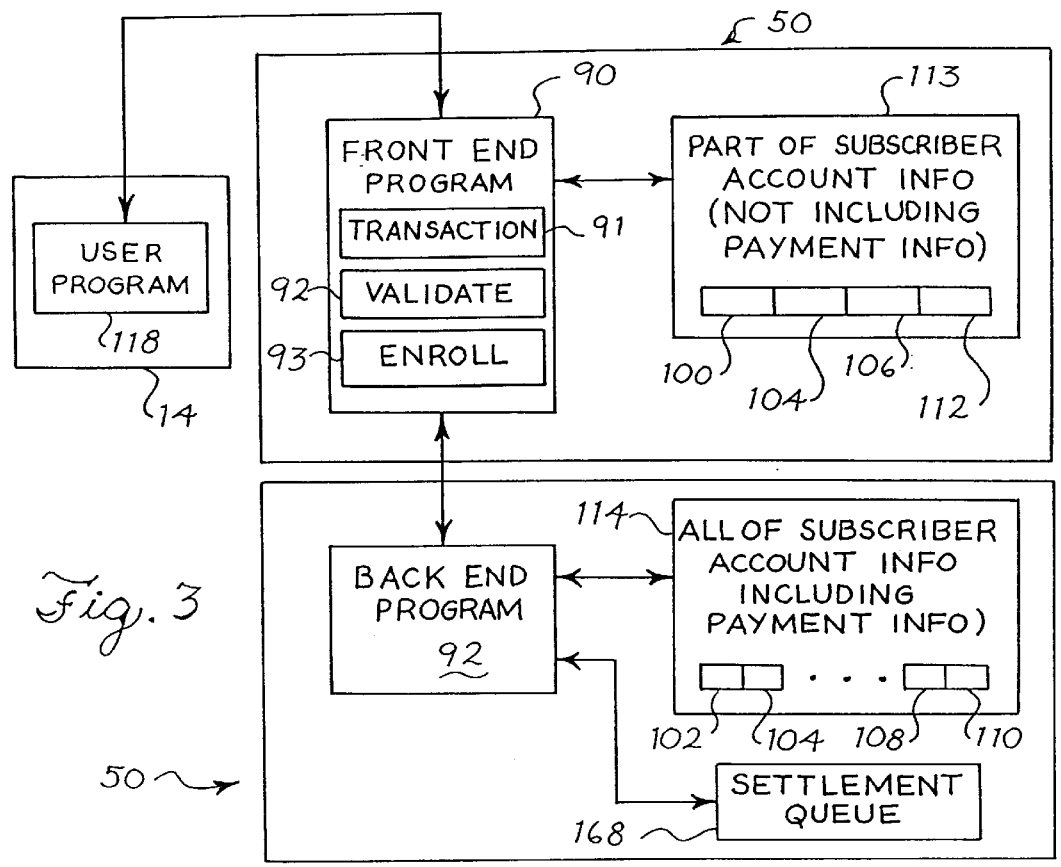
FIG. 3 is a block diagram of the program arrangement of the payment system of FIG. 1.

Referring to FIG. 3, the front end computer 50 runs a front end program 90. The front end program 90 is a software program that provides for communication with users 14 on the Internet network 12. The front end program 90 includes several modules that can be accessed and used by users 14 of the Internet. The modules included on the front end program include modules that permit users 14 to make a funds transfer transaction 91, to check a subscriber's status 92, to enroll as subscribers 93, etc.

The back end computer 52 runs a back end program 92. Thus, the front end program 90 is physically separate and isolated from the back end program 92. The back end program 92 receives information from and sends information to the front end program 90 only by means of batch processing. This results in an inherently safe method of communicating between the publicly accessible part of the payment system, i.e. the front end computer 50, and the secure part of the payment system, i.e. the back end computer 52.

II. Requirements of a Subscriber

In order to use the payment system 10 for transactions, the information buyer 20 and the information seller 28 both need to have subscriber or cardholder accounts with the payment system 10. As subscribers, users of the Internet network 12 may conduct commercial transactions with each other, such as paying for information products 26, making charitable contributions, etc.

Figure 4:
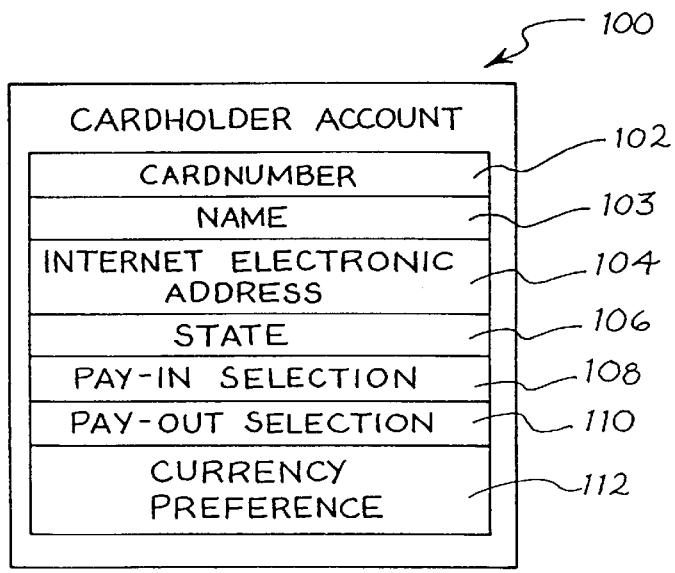
FIG. 4 is a diagram of data for a cardholder account for use with the payment system of FIG. 1.

Referring to FIG. 4, a cardholder account 100 includes at least the following information: a cardnumber 102, an Internet e-mail address 104, a state 106, a pay-in selection 108, a pay-out selection 110, and a currency preference 112. Each of these items is explained below.

The cardnumber 102 uniquely identifies the cardholder account 100. The cardnumber 102 is an alphanumeric string that is easily typed and read by a human. Also, the cardnumber 102 is relatively hard to guess and bears no deducible relationship to any financial artifact, such as a credit cardnumber, a checking account number, nor to any e-mail address.

The cardholder Internet e-mail address 104 is the e-mail address of the cardholder that is unique for each user of the Internet.

The state 106 is one of "active", "suspended", or, "invalid".

The pay-in selection 108 is how the cardholder transfers funds, i.e. makes payment, to the payment system 10. Typically, this may be done by using a conventional authorization to charge a credit card. The pay-in selection is not encoded in or directly derivable from the cardnumber.

The pay-out selection 110 is how a the payment system 10 transfers funds to, i.e. pays, the cardholder. This may include use of a direct deposit checking account, etc. The pay-out selection 110 is not encoded in or directly derivable from the cardnumber.

The currency preference 112 is the national currency used for the pay-in selection 108 and pay-out selection 110 between the payment system 10 and the subscriber.

Subscriber account information is distributed in the payment system 10. Referring again to FIG. 3, only a portion of the subscriber account information resides on the front end computer 50 where it is accessible by the front end program 90. However, a full copy of all the cardholder account information resides on the back end computer 52 where it is accessible by the back end program 92. Included on the back end computer 52 is a copy of the portion of the cardholder information on the front end computer 50. Specifically, the part of the subscriber account information that resides on the front end computer 50 is located in a data file 113 stored on the front end computer storage device 58. The subscriber account information that resides on the back end computer 52 is located in a data file 114 stored on the back end computer storage device 72.

Specifically with respect to the items of information in a cardholder account, located on the storage device 58 associated with the front end computer 50 is that portion of the subscriber account information 106 that includes the subscriber account number 102, the Internet e-mail address information 104, the state 106, and the currency preference 112. However, the front end computer 50 does not contain any of the pay-in 108 or pay-out 110 information, such as credit card information, etc., associated with any of the subscribers. Credit card or other payment information is located only in the data file 114 on the storage device 72 of back end computer 52

To access the front end program 90 over the Internet, users 14 may use a user interface software program 118 that can be run on their own computers for interactive access, or alternatively, users 14 may access the payment system 90 via conventional e-mail programs, for store-and-forward access. Programs 90 and 118 may be written in any suitable programming language, such as Tcl or C. The software modules are capable of being used with the UNIX operating system, DOS, and may be ported to various other operating systems. Listings of code for the front end program 90 and the user interface program 118 are included at appendices A and B, repectively. A publication entitled "The application/greencommerce MIME Content-type" is included at appendix C and includes a format for Internet communication for use between users of the Internet and the payment system 10.

III. Methods of Operation of the Payment System

As mentioned above, the payment system 10 provides users of the Internet with a variety of services and functions, including making a funds transfer transaction, validating a subscriber's status, and enrolling as a subscriber. Several of these services and functions are described below.

A. Funds Transfer Transaction

A funds transfer transaction occurs when one Internet user who is a subscriber, i.e. who has a cardholder account on the payment system 10, acting as an information seller 28, requests payment from another cardholder, acting as an information buyer 20. Typically, this may occur when a buyer 20 purchases an information product 26 over the Internet 12. However, this transaction may result for other reasons, e.g. to facilitate charitable contributions, to pay for computer or software customer support, etc.

For purposes of the example described below, it is assumed that the buyer 20 already is aware that the seller 28 has an information product 26 to sell and that a price has been established. The buyer 20 may be aware of the seller 28 and his information product via advertising, on the Internet or other media, through others, from a bulletin board, from a product warehouse on the Internet, or any other means. The buyer 20 is aware of a means to contact the seller via the Internet. The buyer 20 may contact the seller 28 by sending a message to the seller's Internet address or by an interactive protocol, World Wide Web (WWW), FTP, etc., so that a message can be sent to the seller 28. The means to contact the seller may be included in advertising, etc.

Figure 5:
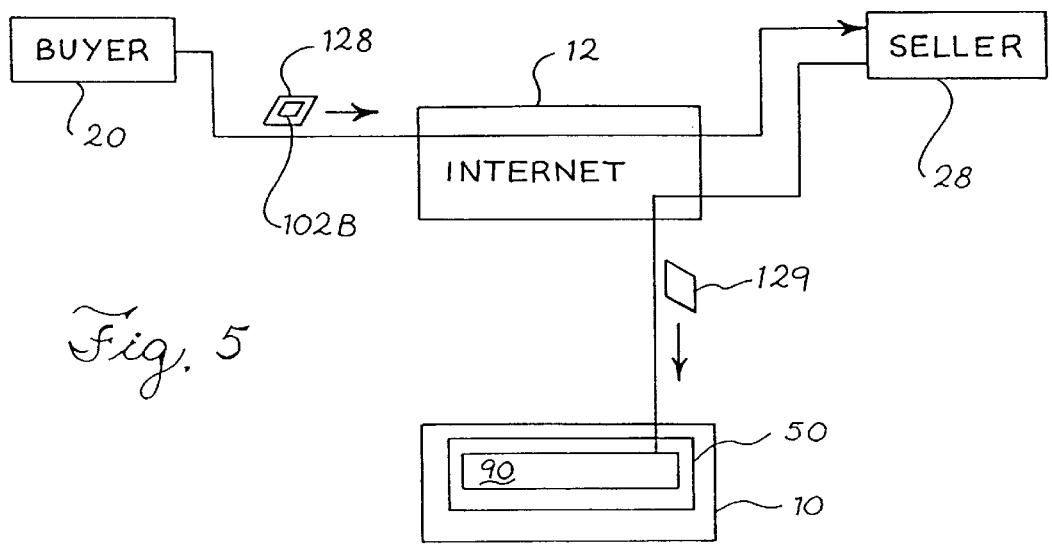
FIG. 5 is a flow chart showing message flow for the initial steps of a funds transaction using the payment system of FIG. 1.

FIG. 5 shows an initial part of the message flow for a funds transfer transaction according to the first embodiment of the present invention. The Internet user who is the buyer 20 sends a message 128 to (or otherwise communicates with by means of interactive protocols, WWW, etc.) the Internet user who is the seller 28 via the Internet 12. The communication 128 sent by the buyer 20 to the seller 28 includes the buyer's cardnumber 102B ("102B"=cardnumber "102"+ buyer "B"), as illustrated in FIG. 6A. The buyer's message 128 is the first step in initiating the funds transfer transaction using the payment system 10. Alternatively, the buyer 20 may include the cardnumber 102B as a username in a file transferred from the buyer 20 to the seller 28 using the Internet 12.

B. Inquiry Transactions

At this stage, the seller 28 may wish to communicate with the payment system 10 to have a cardnumber inquiry transaction performed on the buyer's cardholder number. A cardnumber inquiry transaction occurs when one cardholder wishes to ascertain the state 106 of another cardholder's account. Typically, a cardnumber inquiry transaction occurs when one cardholder, acting as a seller, is deciding whether to send an information product 26 to another cardholder, who represents to be a cardholder and who is interested in acquiring the information product from the seller 28.

Referring to FIG. 7, the seller 28 may send an inquiry-request message 216 containing the buyer's cardnumber 102B to the front end program 90 using the Internet 12. As shown in FIG. 6B, the inquiry-request message 216 contains at least the buyer's cardnumber 102B. In response, the front end program 90 sends the seller 28 an inquiry-result message 218. As shown in FIG. 6C, the inquiry-result message 218 contains the buyer's cardnumber 102B and the state 106B associated with the buyer's account. If the buyer's cardholder account state 106B is "active", presumably the buyer is in good standing and the seller 28 can proceed with the transaction by sending the information product 26 to the buyer 20 via the Internet. If the buyer's cardholder account status 106B is "invalid", the seller 28 knows that the account is no good and that funds transfer transactions cannot be processed through it. If the buyer's cardholder account status 106B is "suspended", the seller knows that the buyer 20 has not been responsive to recent transaction attempts. The seller 28 may still decide to send the information product 26 to the buyer 20 and a funds transfer transaction will be processed. No guarantee of payment is made however.

Although an information seller 28 may prefer to send an inquiry-request 216 to the payment system 10 prior to sending an information product to the buyer 20, the seller 28 may choose to skip the inquiry-request step. At this stage, the seller 28 sends the information product 26 to the buyer 20 via the Internet.

Funds Transfer Transaction (continued)

Referring again to FIG. 5, at approximately the same time that the seller 28 sends the information product to the buyer 20 via the Internet, the seller 28 also sends a transfer-request message 129 to the payment system 10 via the Internet 12. Specifically, the seller 28 sends the transfer-request message 129 to the front end program 90 on the front end computer 50. The transfer-request message 129 may be sent by either e-mail or using an interactive protocol on the Internet 12. Referring to FIG. 6D, the transfer-request message 129 contains the following information: the buyer cardnumber 102B, the seller cardnumber 102S, a transfer type 130 (e.g., sale of information), a textual description 132 of the transaction, a transfer amount 134, the currency 112S (e.g., USD); and optionally, the merchant's transaction-identifier 136.

Figure 8:
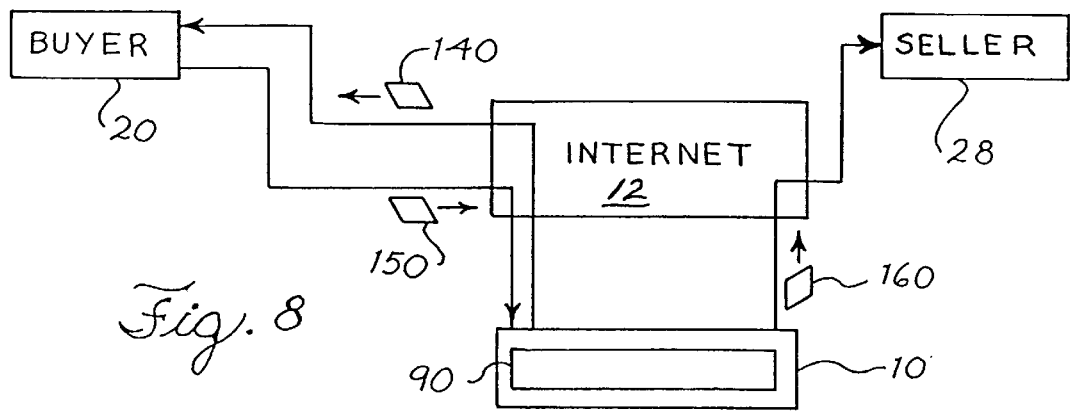
FIG. 8 is a flow chart showing the message flow for a transfer query request and reply using the payment system of FIG. 1.

After receiving the transfer-request message 129, the front end program 90 asks the buyer 20 whether the buyer 20 wishes to authorize payment for the transaction 132 to the seller 28. Specifically, the front end program 90 sends a transfer-query message 140 to the buyer 20, as shown in FIG. 8. Using the information contained in the transfer-request message 129 from the seller 28, specifically the buyer's cardnumber 102B and the seller's cardnumber 102S, the front end program 90 looks up the buyer's name 103B and the seller's name 103S. As shown in FIG. 6E, the transfer-query message 140 contains: a transaction-identifier 142 uniquely-generated by the front end program 90, the buyer's name 103B, the seller's name 103S, the transfer type 130, the textual description of the transaction 132, and a transfer amount 135 in the currency preference 112B associated with the buyer's cardholder account (which may represent a currency exchange of the transaction amount 134 into the buyer's currency preference 112B and further which fixes the transfer amount, with respect to currency fluctuations, in the currency used by the buyer). In addition, if currency denomination exchange occurred, the original currency 112S and amount 134 are noted in the message 140. In the transfer-query message 140, the buyer's name 103B and the seller's name 103B are used instead of the buyer's cardnumber 102 and the seller's cardnumber 102S in order to minimize transmission of the cardnumber information over the Internet thereby improving security of the system. After sending the transfer-query message 140, the front end program 90 waits for a response from the buyer 20.

The buyer 20 may respond by sending a transfer-response message 150 to the front end computer 50 via the Internet, as shown in FIG. 8. As illustrated in FIG. 6F, the transfer-response message 150 contains the following data: the payment system generated transaction-identifier 142 and an indication 152 of the buyer's willingness to allow transfer of funds. The willingness indication 152 is one of "yes", "no", or, "fraud".

In a preferred embodiment, the structure of the transfer-query message 140 facilitates preparation of the transfer-result message 150 by the buyer 20. In the transfer-query message 140, the transaction-identifier 142 is placed in the "subject" of the transfer-query message 140 and the e-mail address to which the buyer's transfer-response message 150 should be sent (e.g. "response@card.com") is placed in the "sender's address" of the transfer-query message 140. Many conventional e-mail programs in use on the Internet, including many older programs, have a feature that will automatically read the "subject" and "sender's address" of a received message and format a reply message directed to the sender's address with the same "subject" as the received message. If the buyer 20 uses this common feature to send his transfer-response message 150 back to the payment system 10, the only information that the buyer 20 will have to add is the willingness indication 152 which is only a one word reply, (i.e. "yes", "no", or, "fraud").

Referring again to FIG. 8, if the buyer 20 indicates "yes" in the willingness indication 152, the front end program 90 then sends a transfer-result message 160 to the seller 28 via the Internet 12. As shown in FIG. 6G, the transfer-result message 160 contains the following information: the transaction-identifier 142, the seller's name 103S, the buyer's name 103B, the transfer type 130, the textual description of the transaction 132, the transfer amount 135 in the currency 112B associated with the buyer's cardholder account, the indication 152 of the buyer's willingness to allow transfer of funds, and the seller's transaction-identifier 136 if present in the originating transfer-request message 129. In addition, if currency denomination exchange occurred, the original currency 112S and amount 134 are noted in the transfer-result message 160. The front end program 90 transfers the transaction information, by batch processing, to the back end program 92 which adds the transaction information to a settlement queue 168. The settlement queue 168 is a data file located on the storage device 72 of the back end computer 52.

Referring back to the step shown in FIG. 8 where the buyer 20 sends the transfer-response message 150 back to the payment system 10, if the buyer 20 replies "no" in the willingness indicator 152, the front end program 90 sends a transfer-result 160 to the seller 28 with a "no" indication 152. In addition, a service charge to the buyer 20 may be generated. Information regarding the buyer's "no" reply in the transfer-response 150 is batched from the front end program 90 to the back end program 92 where a service charge may be added to the settlement queue 168 for the buyer 20. Further, if a "no" indication is received more than a certain number of times in a certain number of transactions over a certain time period, then the state 106B of buyer's account 100B will become "suspended". This is to prevent a user from making a practice of ordering and receiving information products without paying for them. If the buyer's account state 106B becomes suspended, this information is also transmitted by batch processing from the front end program 90 to the back end program 92 so that the cardholder account information on the back end computer 52 conforms to that on the front end computer 50.

Referring again back to the step shown in FIG. 8 where the buyer 20 sends the transfer-response message 150 back to the payment system 10, if the buyer 20 indicates "fraud" in the willingness indication 152, the payment system 10 changes the state 106B of the buyer's cardholder account 100B to "invalid". A response of fraud indicates that the buyer 20 never requested the information product 26. The information that the buyer 20 responded "fraud" to the willingness indication 152 is also transmitted by batch processing from the front end program 90 to the back end program 92 so that the cardholder account information on the back end computer 52 conforms to that on the front end computer 50.

Referring back to the step illustrated in FIG. 8 where the front end program 90 sends the transfer-query message 140 to the buyer 20, if a period of time elapses and the front end program 90 does not receive a transfer-response message 150 from the buyer 20, the front end program will send the transfer-query message 140 again, i.e. a second notice. The front end program 90 may send the transfer-query message to the buyer 20 several times until a response from the buyer 20 is obtained. If more than a certain number of days elapses, or more than a certain number of transfer-query messages 140 are outstanding for the buyer 20, and the front end program does not receive a transfer-response message 150 from the buyer 20, then the front end program 90 causes the buyer's cardholder account 100B to become suspended. This is done by changing the buyer's cardholder state 106B from "active" to "suspended". However, if a transfer-response 150 is received and/or the number of outstanding transfer-query messages 140 for the buyer 20 drops to less than a certain threshold, the buyer's account 100B may be returned to an "active" state. Further, any outstanding transfer-query messages 140 may be sent again some time later.

C. Accumulation and Settlement of Transactions

1. Processing Charges to Buyers

Processing of the charges and credits between the back end computer 52 and the settlement system 30 is conducted off the Internet using secure communications channels. This isolates the buyer-seller activity which occurs on the Internet from the financial and credit activity which occurs off the Internet.

Referring to FIGS. 1 and 3, the back end program 92 regularly checks the accumulated purchase transactions for each cardholder in the settlement queue 168 for age and amount. For example, the back end program 92 checks whether the accumulated purchase transactions for a cardholder are either 30 days old or reach a threshold of at least $10.00. When the accumulated purchase transactions for a cardholder reach either the age or amount threshold, the back end program 92 batches the accumulated transactions into a single funds transfer transaction using the buyer's pay-in selection 108B associated with the buyer's cardholder account 100B. This is typically accomplished by posting a charge 194 to the buyer's credit card account. To post a charge on the buyer's credit card account, the back end program 92 transmits an accumulated charge 194 to the credit card system network 30 via the acquirer component 34 where the payment system 10 maintains a conventional merchant account. The credit card network includes a component 196 that initially checks the validity of the buyer's credit card number, e.g. pay-in selection 108B, to determine whether the credit card is lost, stolen, expired, overlimit, etc.

If the credit card network 30 refuses to process the buyer's credit card number, e.g. the credit card is lost, stolen, canceled, expired, etc. collection from the buyer is considered failed. The back end program 92 changes the buyer's cardholder state 106B to "suspended". The back end program 92 also sends the failure information, by batch processing, to the front end program 90 so that the buyer's cardholder state 106B on the front end computer 50 is also changed to "suspended".

Figure 9:
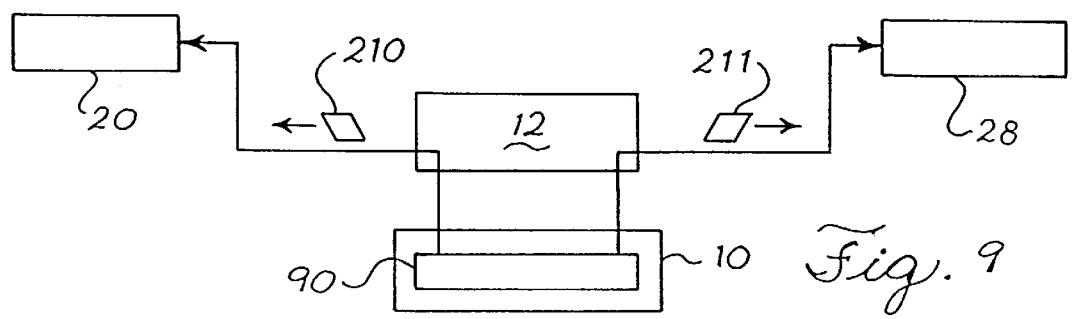
FIG. 9 is a flow chart showing the message flow for payment failure using the payment system of FIG. 1.

Referring to FIG. 9, the front end program 90 then sends a payin-failure-notification message 210 to the buyer 20 over the Internet. As shown in FIG. 6H, the payin-failure-notification message 210 contains the notification-identifier 144 associated with the pay-in method 108, the transfer amount 134, and the currency 112S.

In addition, for each transaction associated with the payin-failure-notification message 210, the front end program 90 also sends a collection-failure-notification message 211 to the seller 28 over the Internet. As shown in FIG. 6I, this collection-failure-notification message 211 contains the server's transaction-identifier 138, and the amount 134 and currency 112 associated with the transaction.

Referring back to the step where the back end program 92 transmits the accumulated charge 194 to the credit card network 30, if the credit card network 30 accepts the buyer's card, the acquirer 34 then processes the accumulated charge 194 in the credit card system 30 to post the charge to the buyer's credit card in the usual manner by sending the appropriate information to the buyer's credit card issuer 32. The buyer's credit card issuer 32 sends the buyer 20 a credit card bill 190, typically via the postal system. The credit card bill 190 lists the accumulated charge 194 as an item on the user's credit card bill. Since accumulated charges 194 for a cardholder are sent to the acquirer 34 when they reach a certain threshold amount, more than one accumulated charge may be listed on the credit card bill sent to the buyer 20 by the buyer's credit card issuer 32.

The description previously set forth explains how the payment system can process a charge to the user using the conventional, commercially available credit card system. There are variations on and modifications of the previously set forth arrangement that may be utilized. For example, the issuer 32 may process a debit to a bank account of the buyer 20 instead of sending a credit card bill. Alternately, the issuer 32 may send the buyer a bill (other than a credit card bill) for the accumulated charges.

Figure 10:
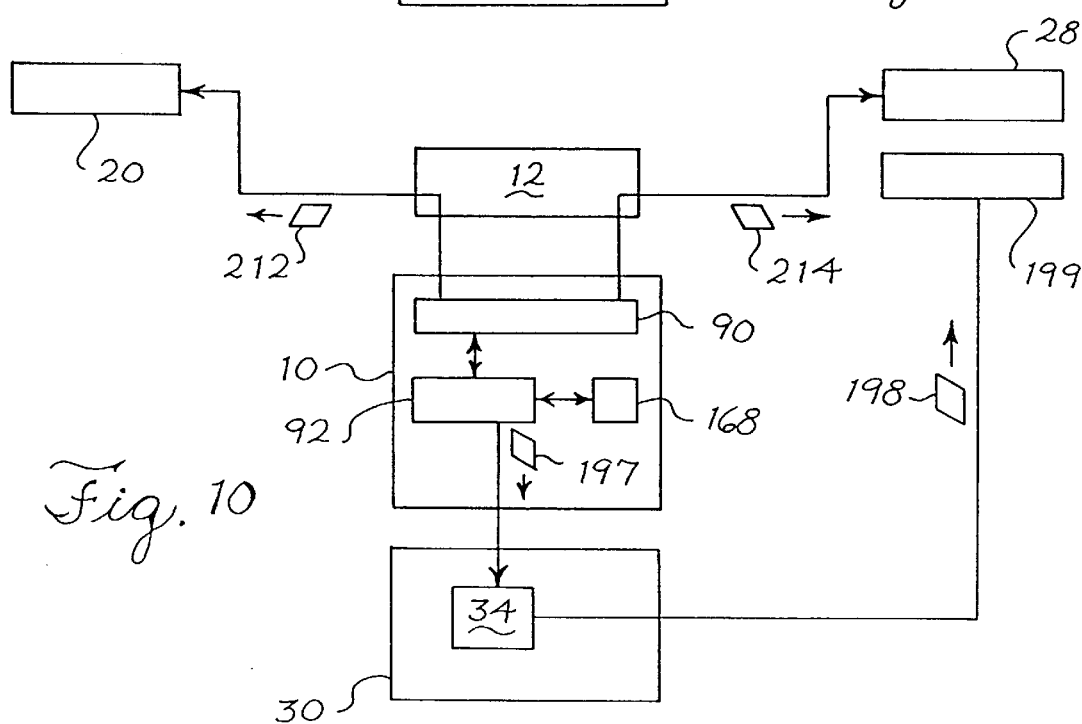
FIG. 10 is a flow chart showing the message flow for payment notification using the payment system of FIG. 1.

Referring back to the step where the back end program 92 sends the accumulated charge 194 to the credit card system 30, if the credit card system 30 accepts the buyer's credit card number, the back end program 92 sends indication of this acceptance, by batch processing, to the front end program 90. The front end program 90 sends a payin-notification message 212 to the buyer 20 via the Internet, as shown in FIG. 10. As shown in FIG. 6J, the payin-notification message 212 contains the cardnumber 102, the pay-in amount 134 in the currency 112 associated with the buyer's account, the notification-identifier 144 associated with the pay-in method 108, a list of accumulated transactions 146, and, optionally, a service charge 148.

2. Processing Payments to Sellers

Referring to FIG. 10, if the credit card system 30 accepts the accumulated transaction 194 from the back end program 92, the back end program 92 treats the payment as made by the buyer. The back end program 92 calculates fees associated with the transaction. For example, the back end program will subtract the charge applied by the credit card system 30 from the amount paid by the buyer. The back end program 92 will also subtract a service charge for the payment system 10. The back end program 92 will then calculate a net settlement to the seller for the transaction. The net settlement will be posted to the settlement queue 168 for the seller 28 located on the back end computer 52.

The back end program 92 periodically checks the settlement queue 168 to see if payments have accumulated for the seller 28. Regularly, the back end program 92 will batch the accumulated payment transactions into a single off-Internet transaction, using the pay-out method 110S associated with the seller's account 100S. In a preferred embodiment, transactions that have accumulated for a seller may be retained for a period of time before the single off-Internet payment transaction to the seller is made. This period of time may vary depending on the payment history of the seller. For example, a payment that is received from the credit card system 30 may be held for a period of 60 days before it is combined with other accumulated transactions and paid to the seller by means of the seller's indicated off-Internet payment method.

One way that a payment may be made to the seller is by direct deposit to a checking account maintained by the seller. The back end program 92 transmits information 197 to the settlement system 30 to make a direct deposit 198 to the seller's checking account 199. If the acquirer component 34 is a commercial bank, the back end component 92 may use the acquirer 34 to transmit the direct deposit information from the acquirer-bank to the seller's bank for direct deposit to the seller's checking account 199.

In addition to sending the information to the settlement system 30 to effect payment to the seller, e.g. by making a direct deposit to the seller's checking account, the back end program 92 also sends information, by batch processing, to the front end program 90 that an accumulated payment to the seller has been initiated. The front end program 90 then sends a message via the Internet informing a seller 28 that payment has been made to the seller's account. The front end program 90 sends a payout-notification message 214 to the e-mail address 104S associated with the seller's cardholder account. As shown in FIG. 6K, the payout-notification message 214 contains the cardnumber 102S, the pay-out amount 150 in the currency 112 associated with the cardholder's account, the notification-identifier 152 associated with the pay-out method 110 the list of accumulated transactions 146, and, optionally, a service charge 149.

D. Chargeback Transactions

A chargeback transaction occurs when a funds transfer associated with a previous payin-notification message results in a chargeback. Typically, this occurs when a buyer 20, whose pay-in method 108B is a credit card, disputes a charge on his credit card statement. FIG. 11 shows the message flow for a chargeback transaction having the following steps:

The front end program 90 sends a payin-chargeback-notification message 220 to the buyer 20 over the Internet. As shown in FIG. 6L, the payin-chargeback-notification message 220 contains the notification-identifier 144 associated with the pay-in method 108, and, the pay-in amount 134 in the currency 112 associated with the buyer's account 100.

Also as shown in FIG. 11, for each accumulated transaction associated with this chargeback, the front end program 90 also sends a payout-chargeback-notification message 222 to the seller 28 over the Internet. As shown in FIG. 6M, the payout-chargeback-notification message 222 contains the server's transaction-identifier 138, the amount 134, and the currency 112 charged back to the buyer 20.

E. Payment system capability transaction

A payment system capability transaction occurs when a user wishes to ascertain the capabilities of a payment system 10. FIG. 12 shows the message flow for a payment system capability transaction having the following steps:

A user 14 uses the Internet 12 to send a capabilities-request message 224 to the payment system 90. As shown in FIG. 6N, the capabilities-request message 224 has no specific attributes, i.e. it contains no specific information fields, it may be only a query. The payment system 90 sends a capabilities-result message 226 to the user 14. As shown in FIG. 6O, the capabilities-result message 226 contains a list of supported transaction types and parameters 156, a list of supported currencies 158, and a list of supported languages 159.

F. Cardholder application

Figure 13:
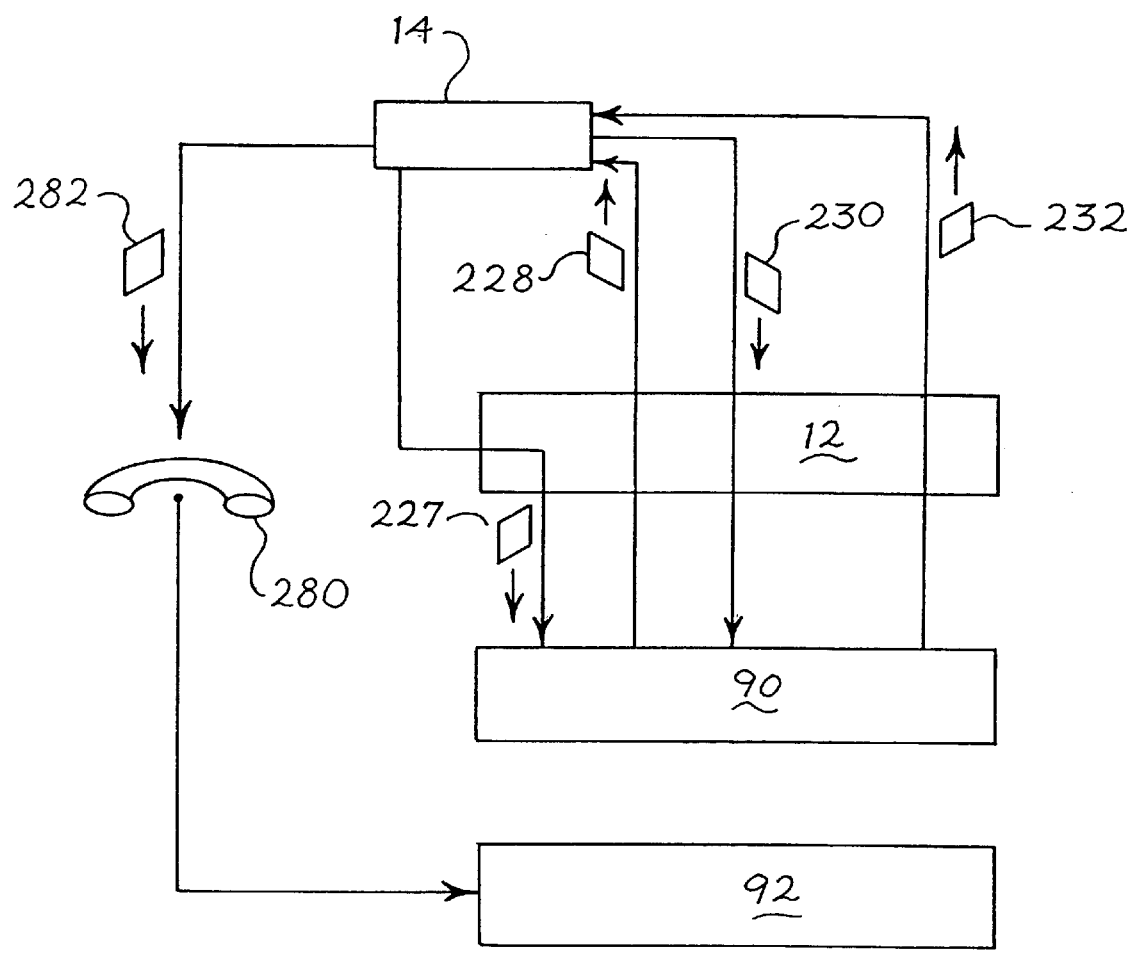
FIG. 13 is a message flow diagram showing messages for a new account transaction between a user and the payment system of FIG. 1.

A cardholder application transaction occurs when an Internet user 14 wishes to establish a cardholder account 100. FIG. 13 shows the steps for the application process for a cardholder application.

The user 14 sends an application-request message 227 over the Internet 12 to the payment system 90. This request may be sent by either electronic mail or using an interactive protocol. The payment system 90 sends an application-result message 228 to the user 14. As shown in FIG. 6P, the application-result message 228 is essentially a blank form into which the user enters information for the following: the applicant's name, address, phone number, Internet e-mail address 104, and the currency preference 112, language, and preferred account identifier ID.

The user 14 fills in parameters from the application-result message 228, and sends a newacct-request message 230 to the payment system 10. The payment system 10 sends the user 14 a newacct-result message 232. As shown in FIG. 6Q, the newacct-result message 232 contains the status 106 of the application, and if the application is approved, the cardnumber 102 assigned to the user 14.

It is noted that credit card numbers or other sensitive information relating to financial transaction are not sent over the Internet. The user who wishes to open a cardholder account sends only part of the required cardholder information over the Internet in the newacct-request message. In order to complete the cardholder application process, the user 14 provides his credit card information, checking account information, or other financial information to the payment system 10 through non-Internet channels. This credit card information, checking account information, or other financial information is maintained on the back end computer 52 of the payment system 10 in the secure data file 114. The user 14 calls a telephone number 280. This may be an 800 number in the U.S. or a toll number for foreign calls. The user 14 is prompted to enter his the credit card information 282 by touch tone entry. Thus, the user's credit card information is not transmitted over the Internet at any time thereby contributing to the security of the system.

IV. Advantages of the Payment System

In the embodiment of the invention described above, there is provided a new model for Internet commerce in which an information seller 28 carries the risk of non-payment. By shifting the risk of non-payment, the embodiment of the present invention avoids the necessity of guarantees of credit worthiness for sellers. This allows every participating Internet user to be both a buyer and a seller of information on the Internet. However, it is noted that various aspects of the model (e.g., buyer confirmation, limitations on buyers' refusals to pay, etc.) minimize a seller's risk to the point where it is offset by the expanded commerce base created.

Buyers of information products often cannot make a purchase decision unless the product in hand. Given that there is virtually no cost for manufacturing and distribution, unwanted information products need not be "returned"; it is less costly merely to delete the unwanted information product. Buyers of information products pay only for the information that they can use, thereby avoiding the frustration of returning unwanted goods and asking for a refund as they would in a conventional marketplace Cardnumbers are bi-directional, i.e., a cardholder may engage in commerce as either a buyer or a seller. Hence, the terms "seller" and "buyer" are merely role-descriptors with respect to a given transaction, e.g., the cardnumber acting as a buyer in one transaction might be used in the merchant role for another transaction. Further, the term seller and buyer are generic in that they refer only to the direction of the funds transfer for a transaction. Hence, if a cardholder makes a charitable contribution to a non-profit organization, the cardholder is still referred to as the buyer and to the non-profit as the seller even though no actual "sale" is occurring.

Another advantage of the payment system is that it enables anyone with an information product to sell to have an available market. There is no age limit on information sellers.

The payment system described above is particularly advantageous for use on networks that do not have a centralized management authority, such as the Internet. Other such systems include FIDOnet and UUCP/Usenet, although it is recognized that these systems are considered by some to part of or associated with the Internet. The payment system described above could also be used on future versions, generations, etc., of the Internet. The payment system could also be used on centrally managed computer systems, such as America Online, Prodigy, etc.

Another aspect of the payment system described above is that it enables users to buy and sell information products over a quasi-public network, such as the Internet, regardless of where the users are located or where the payment system is located. Either the buyer or the seller may be located in the U.S. or outside the U.S. Also, some or all of the payment system components, such as the front end computer or the back end computer, may be located either in the U.S. or outside the U.S.

The foregoing detailed description should be regarded as illustrative rather than limiting and the appended claims including all equivalents are intended to define the scope of the invention.

We claim:

1. A method of conducting a transaction with a second party over the Internet on behalf of a third party, comprising the steps of:

on a server of a first party, associating a unique transaction identifier with the transaction and the second party;

sending a first e-mail message over the Internet to an e-mail address of the second party, wherein said first e-mail message includes a first reply e-mail address in a portion of said first e-mail message to which a conventional e-mail program operated by the second party can automatically format and send a reply e-mail message and including said unique transaction identifier, and further wherein said first e-mail message includes a presentation of choices regarding said transaction from which the second party can make a selection, and further wherein said selection can be indicated in a reply e-mail message automatically formatted and sent by an e-mail program of said second party; and on a server of the first party, upon receipt of a second e-mail message, formatted and sent as a reply e-mail message from the e-mail address of the second party and addressed to said first reply e-mail address and including said unique transaction identifier, initiating said transaction on behalf of said third party based upon the indicated selection of said second party.

2. The method of claim 1 further comprising the step of:

after the step of sending the first e-mail message, receiving the second e-mail message on the serve of the first party.

3. The method of claim 1 further comprising the step of:

upon receipt of the second e-mail message including the selection of said second party, sending a third e-mail message to the third party indicating said second party's selection.

4. The method of claim 1 further comprising the step of:

prior to sending said first e-mail message to said second party over the Internet, receiving an e-mail message from the third party identifying said second party and said transaction.

5. The method of claim 1 wherein said second e-mail message is automatically prepared and sent by an e-mail program of said second party.

6. The method of claim 1 further comprising the step of:

maintaining a database on the server, said database associating said transaction identifier and said e-mail address of said second party.

7. The method of claim 1 wherein the step of initiating said transaction further comprises the step of processing said transaction via a secure network off the Internet.

8. The method of claim 1 wherein the step of sending a first e-mail message is performed from the server of the first party.

9. The method of claim 8 wherein the server of the first party that performs the step of initiating the transaction is the same server that performs the step of sending the first e-mail message.

10. The method of claim 1 wherein there are multiple second parties and a single third party.

11. The method of claim 10 wherein each of said multiple second parties has a unique transaction identifier.

12. The method of claim 11 further comprising the step of:

maintaining a database on the server of the first party, said database associating said transaction identifiers and said e-mail addresses of said multiple second parties.

13. A system operated by a first party on behalf of a third party for facilitating transactions on the Internet with a second party, wherein said second party has an e-mail address on the Internet, the system, the system comprising:

a server operated by the first party and connected to the Internet;

a database on the server that associates the e-mail address of the second party with a transaction identifier, wherein the transaction identifier relates to a potential transaction between the second party and the third party; and a program operating on the server that sends and receives e-mail messages over the Internet, said program comprising:

first programming code that automatically prepares and sends a first e-mail message over the Internet to the e-mail address of the second party, wherein the first e-mail message includes an inquiry of said second party including a presentation of choices to which the second party can make a selection regarding the potential transaction, and further wherein said first e-mail message includes the transaction identifier and a second e-mail address, wherein said second e-mail address is included in a portion of said first e-mail message such that a reply e-mail message generated by a conventional e-mail program operated by said second party will automatically format and direct a reply e-mail message over the Internet to said second e-mail address and include said transaction identifier; and second programming code that automatically receives e-mail messages over the Internet sent to said second e-mail address, said second programming code adapted to initiate processing of said transaction between said second party and said third party upon a receipt of a second e-mail message from said second party directed to said second e-mail address and including said transaction identifier and an indication of a selection by the second party from the presentation of choices.

14. The system of claim 13 wherein the program further comprises:

third programming code that automatically prepares and sends a third e-mail message over the Internet to the third party upon receipt of the second e-mail message, wherein the third e-mail message indicates the selection of second party.

15. A method for a first party operating on behalf of a third party to facilitate conducting transactions over the Internet with a second party, the method comprising the steps of:

on a server of a first party, associating a transaction with the second party with a unique transaction identifier;

from said server of said first party, sending a first e-mail message to an e-mail address of said second party wherein said first e-mail message includes a response address to which a computer program of said second party can automatically format and send a reply e-mail message and said unique transaction identifier, and further wherein said first e-mail message includes a message providing choices from which the second party can make a selection regarding said transaction;

from a computer connected to the Internet operated by the second party, receiving said first e-mail message;

from the computer connected to the Internet operated by the second party, operating a program to automatically send a second e-mail message, wherein said second e-mail message is automatically formatted by a program of the second party as a reply e-mail message directed to said response address and including said transaction identifier, and further wherein said second e-mail message includes an indication of a selection from said choices;

on a server of said first party, receiving said second e-mail message directed to said reply e-mail address and including said transaction identifier and said indication of said second party; and from said server of said first party, initiating processing of said transaction based upon said selection by said second party.

16. The method of claim 15 wherein there are multiple second parties and a single third party.

17. The method of claim 16 wherein each of said multiple second parties has a unique transaction identifier.

18. The method of claim 17 further comprising the step of:

maintaining a database on the server of the first party, said database associating said transaction identifiers and said e-mail addresses of said multiple second parties.

* * * * *

UNITED STATES PATENT AND TRADEMARK OFFICE
CERTIFICATE OF CORRECTION

PATENT NO. : 6,246,996 B1
APPLICATION NO. : 09/074354
DATED : June 12, 2001
INVENTOR(S) : Stein et al.

It is certified that error appears in the above-identified patent and that said Letters Patent is hereby corrected as shown below:

On the face page, in field (56), under "Other Publications", in column 2, line 2, after "pp. 28-32" delete ", Aug. 1994".

On the face page, in field (56), under "Other Publications", in column 2, line 7, after "mall)"" delete "Jun. 1994".

On the face page, in field (56), under "Other Publications", in column 2, line 10, after "3 pages" delete ", Apr. 1994".

On page 3, in field (56), under "Other Publications", in column 2, line 39, delete "ointly" and insert -- jointly --, therefor.

In column 4, line 52, delete "SGB" and insert -- 5GB --, therefor.

In column 6, line 10, after "52" insert -- . --.

In column 6, line 22, delete "repectively" and insert -- respectively --, therefor.

In column 10, line 20, after "etc." insert -- , --.

In column 11, line 63, after "110" insert -- , --.

In column 13, line 20, after "marketplace" insert -- , --.

UNITED STATES PATENT AND TRADEMARK OFFICE
CERTIFICATE OF CORRECTION

PATENT NO. : 6,246,996 B1
APPLICATION NO. : 09/074354
DATED : June 12, 2001
INVENTOR(S) : Stein et al.

It is certified that error appears in the above-identified patent and that said Letters Patent is hereby corrected as shown below:

In column 14, line 35, in Claim 3, delete "of" insert -- by --, therefor.

Signed and Sealed this

Twenty-ninth Day of May, 2007

JON W. DUDAS
*Director of the United States Patent and Trademark Office*